(12) United States Patent
Hanser et al.

(10) Patent No.: US 6,345,855 B2
(45) Date of Patent: Feb. 12, 2002

(54) LEVEL FLOOR ROOM EXTENSION

(75) Inventors: Paul E. Hanser, Tipton; Stacy M. Hanser, Davenport, both of IA (US)

(73) Assignee: HWH Corporation, Moscow, IA (US)

( * ) Notice: Subject to any disclaimer, the term of this patent is extended or adjusted under 35 U.S.C. 154(b) by 4 days.

(21) Appl. No.: 09/467,272

(22) Filed: Dec. 20, 1999

Related U.S. Application Data

(63) Continuation of application No. 08/774,326, filed on Nov. 27, 1996, now abandoned.

(51) Int. Cl.[7] .................................................. B60P 3/34
(52) U.S. Cl. ............................... 296/26.14; 296/26.13; 296/165; 296/176; 52/67

(58) Field of Search ........................... 296/26.14, 26.13, 296/26.12, 26.15, 164, 165, 175, 176, 171; 52/67

(56) References Cited

U.S. PATENT DOCUMENTS 4,930,837 A  *  6/1990  Marsh et al. ......... 296/26.14 X
5,620,224 A  *  4/1997  DiBiagio et al. ....... 296/165 X

* cited by examiner

Primary Examiner—Joseph D. Pape

(57) ABSTRACT

A Level Floor Room Extension for expandable and retractable rooms in vehicles employs a subfloor movable from a horizontal stored position beneath the vehicle floor, through an intermediate horizontal position, to an elevated horizontal position, to provide a continuously level floor extending from the interior vehicle floor, over the subfloor, to the slide out room floor.

10 Claims, 16 Drawing Sheets

LEVEL FLOOR ROOM EXTENSION

CROSS-REFERENCE TO RELATED APPLICATIONS

This application is a continuation of application Ser. No. 08/774,326, filed Nov. 27, 1996, now abandoned, the contents of which are incorporated by reference.

STATEMENT REGARDING FEDERALLY SPONSORED RESEARCH OR DEVELOPMENT

Not Applicable.

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to motor homes and recreational vehicles, and more particularly to extendable rooms, and associated extension mechanisms, therefor.

2. Description of the Related Art

A number of units have been developed for motor homes and the like, whereby, when the vehicle is parked, wall portions may be moved to provide an enlarged room area within the vehicle. Fitting various floor parts together to provide an enlarged contiguous floor area has been and remains a problem. Uneven surfaces occur during usage. Gaps in the floor occur. Carpeting can overlap and bunch up at seams and otherwise be worn by operation of the units.

Those concerned with these and other problems recognize the need for an improved Level Floor Room Extension.

BRIEF SUMMARY OF THE INVENTION

The present invention discloses a level floor construction which then is separable into parts in forming an extended room. A subfloor is movable from a horizontal stored position beneath the vehicle floor, through an intermediate horizontal position, to an elevated horizontal position, to provide a continuously level floor extending from the interior vehicle floor, over the subfloor, to the slide out room floor.

Therefore, an object of the present invention is the provision of an improved Level Floor Room Extension.

Another object is to provide an improved extension which provides a better seal at corners where the wall meets the floor.

Also an object is provision of a room extension having improved fitting floor parts such that gapping is reduced.

A further object is to provide an improved extension which minimizes wear on floor carpeting by avoiding scraping movements across the surface of the carpet.

Another object is to minimize uneven or stepped surfaces, that is, to provide an extension such that the floor area exposed is level whether the slide out room is extended or retracted.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
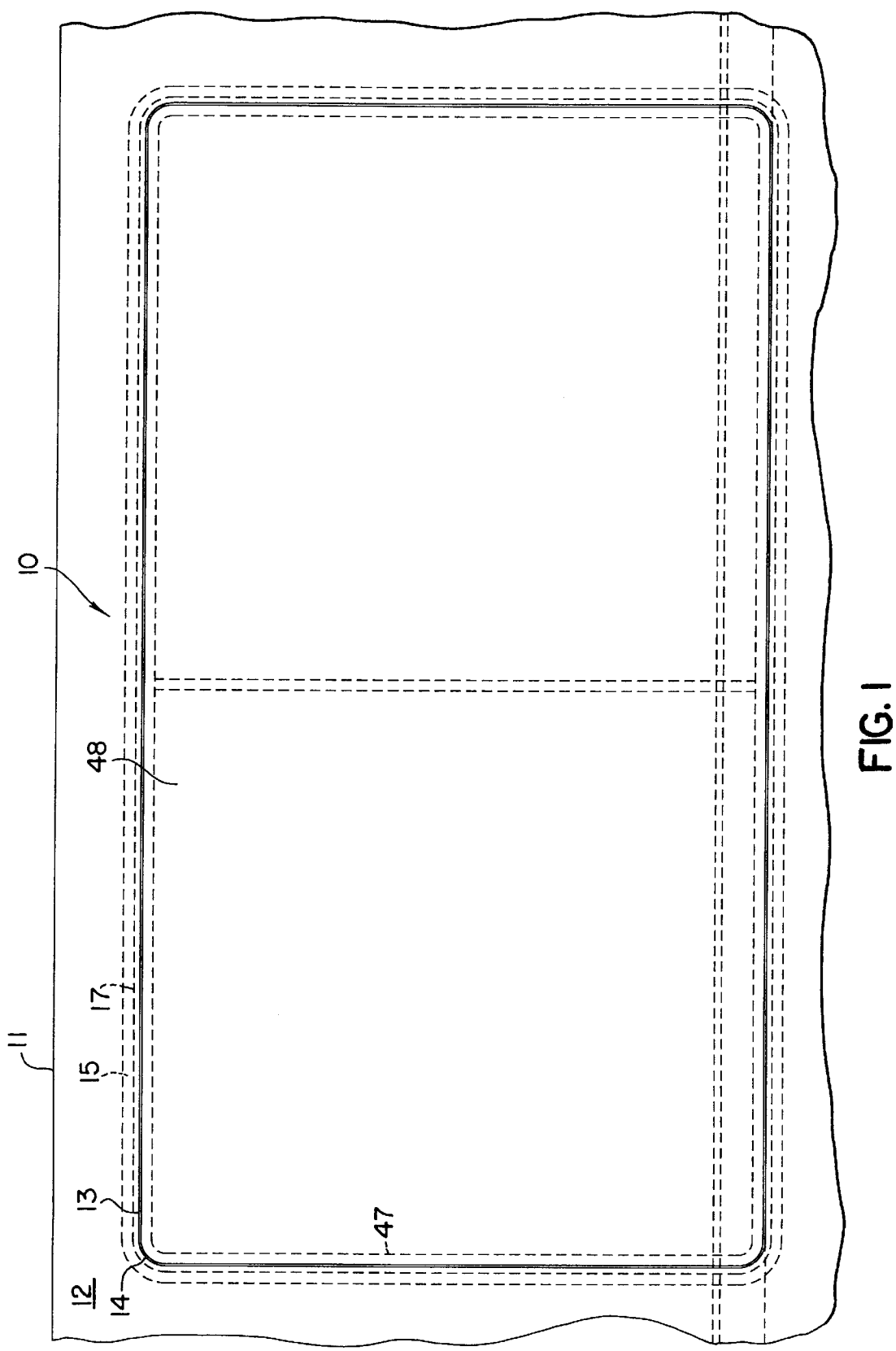
FIG. 1 is a fragmentary, side elevational view showing a vehicle side wall with a moveable slide out room side wall.

Referring now to the drawings, wherein like reference numerals designate identical or corresponding parts throughout the several views, FIG. 1 shows the invention depicted generally at 10 deployed in a coach or vehicle 11. The vehicle sidewall 12 has a cutout opening 13 with generally arcuate corners 14. An interior tube brace 15 is disposed about the periphery of opening 13 and bears a mounting surface 16. A peripheral seal member 17 is disposed on surface 16. The vehicle interior floor 18, comprised of framework 19, flooring 20 and carpet 21 layers, has a three-sided cut out area 22 opening toward the sidewall 12. An overlap area 23 is formed by flooring 20 and carpet 21 extending into the cut out area 22.

Figure 2:
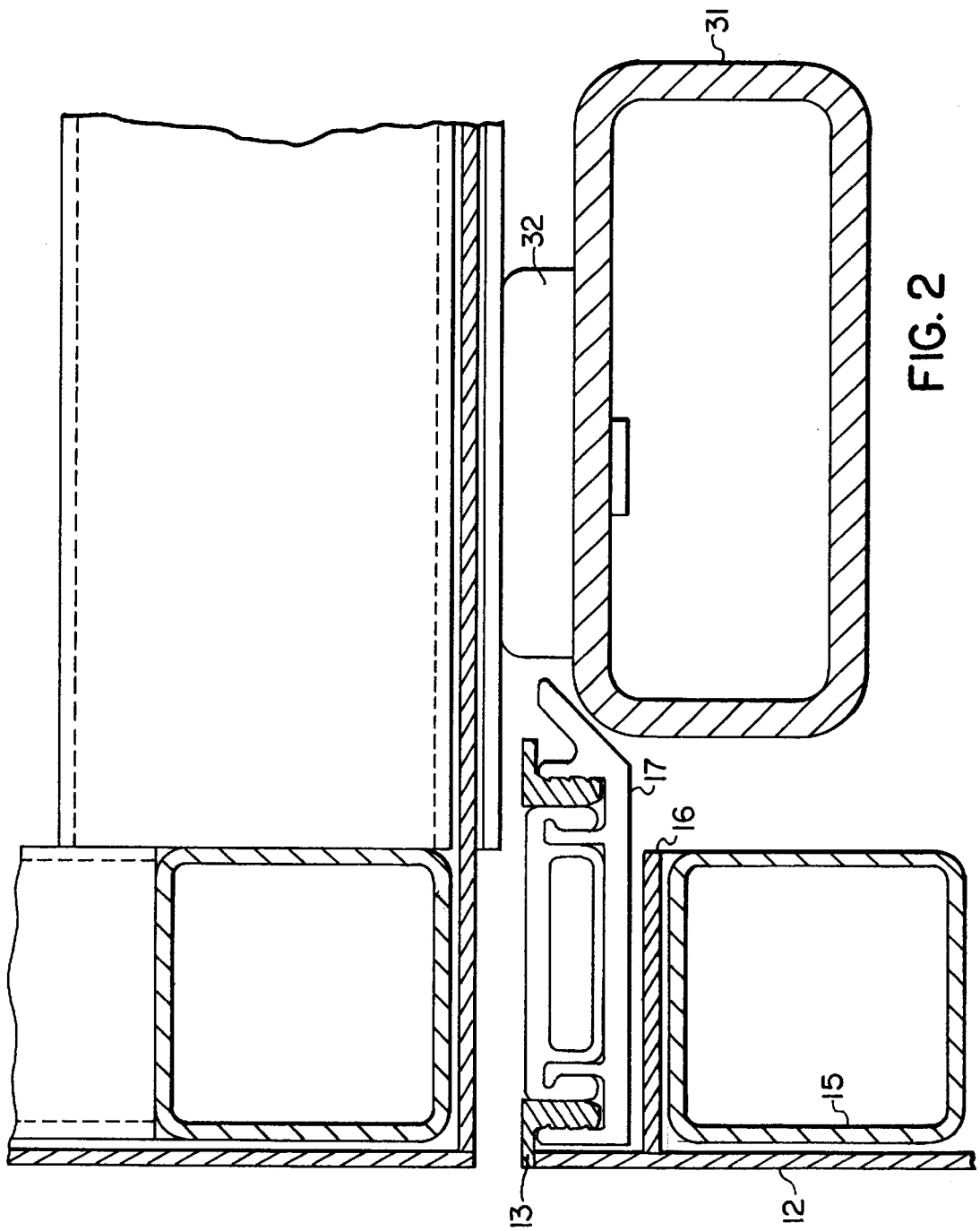
FIG. 2 is an enlarged, fragmentary sectional view taken along Line A—A in FIG. 1.
Figure 3:
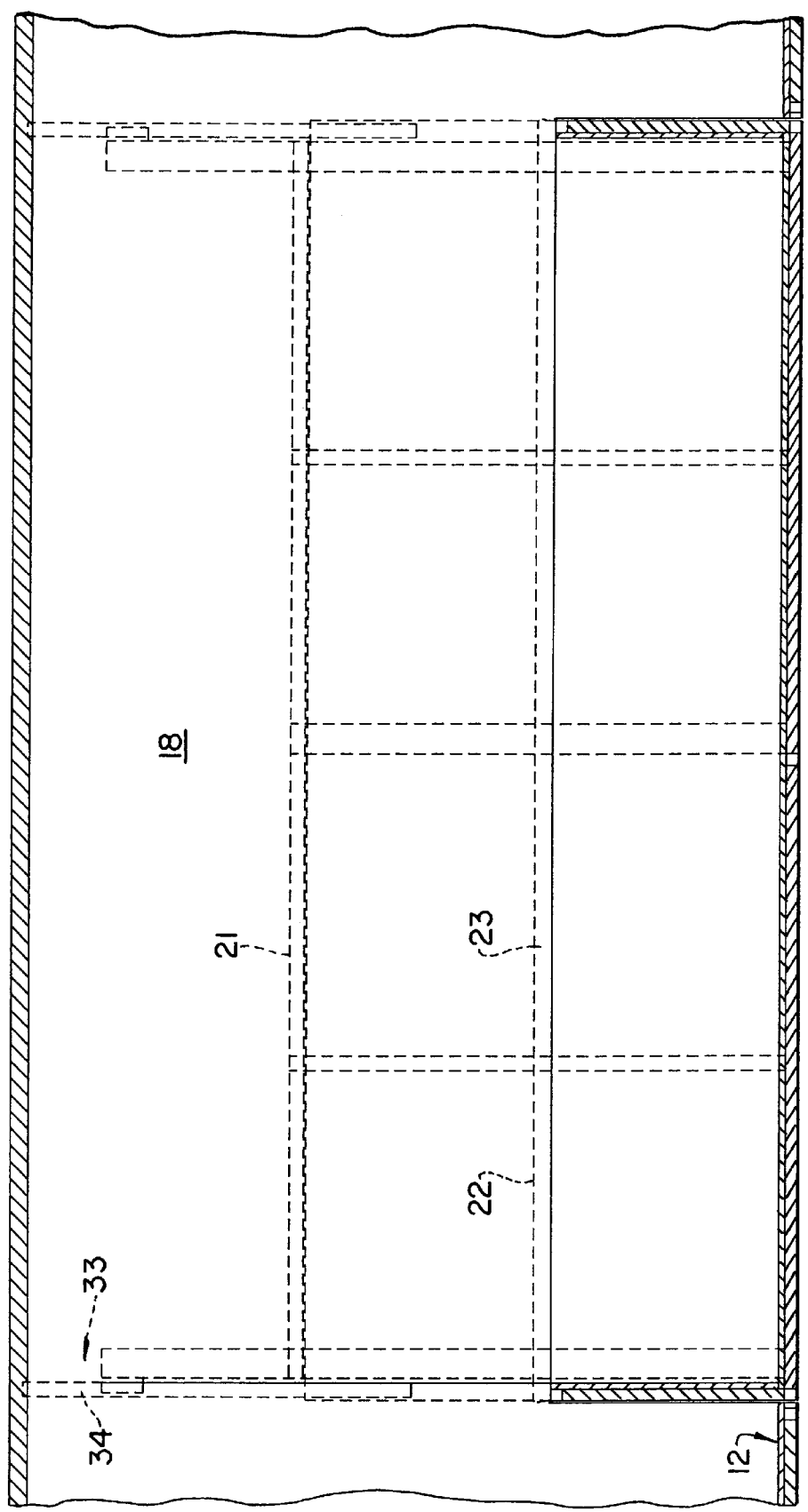
FIG. 3 is a fragmentary, sectional view taken along Line B—B in FIG. 1.
Figure 4:
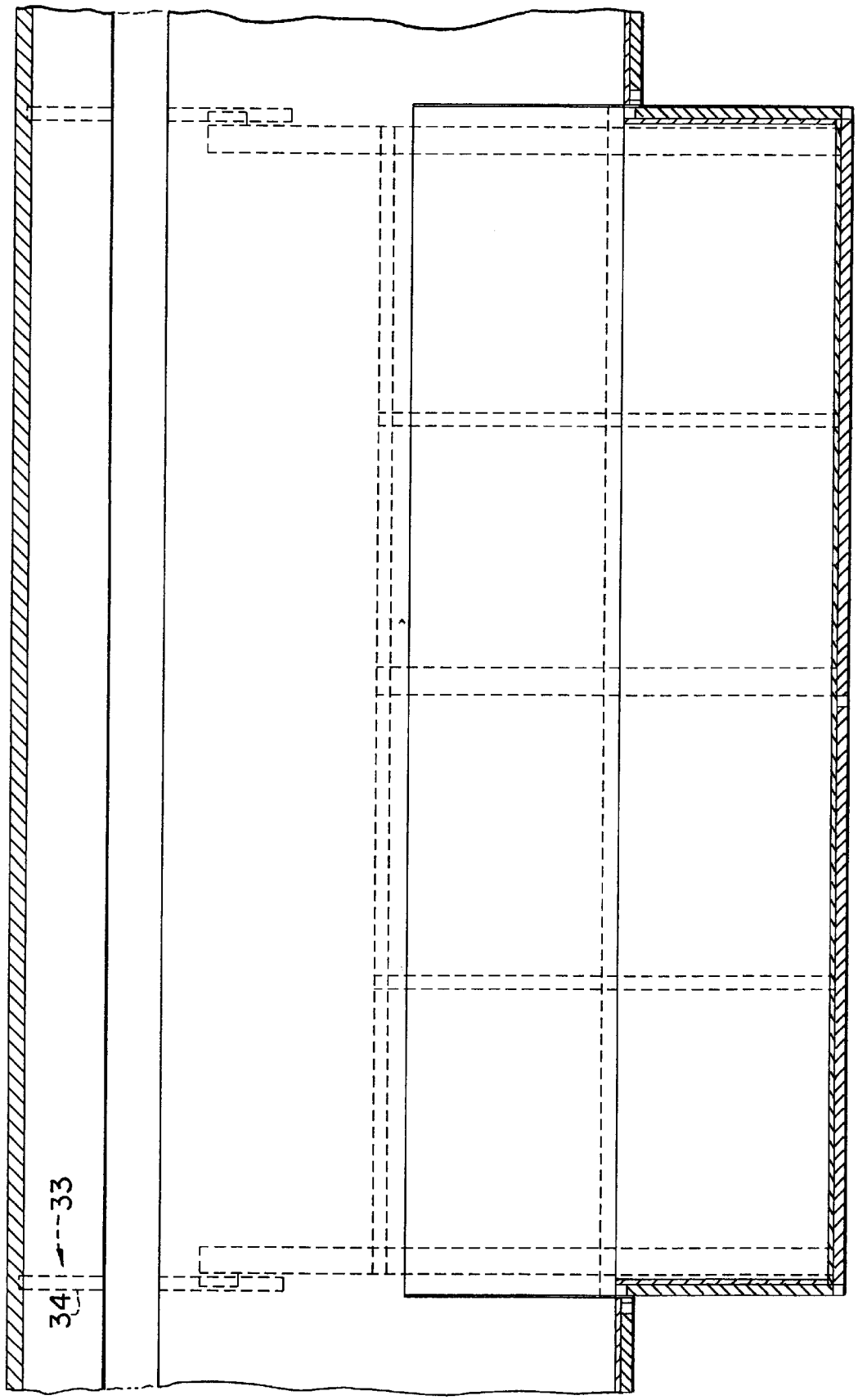
FIG. 4 is a fragmentary, sectional view also taken along Line 4—4 in FIG. 1 but with the slideout room extended.

The level floor room extension 10 has a support assembly 30 which includes a front or outwardly disposed tubular support 31 fixed to brace 15 below opening 13. Slide bearing pads 32 are fixed to the top surface of support 31. See FIG. 2. The assembly 30 also has inwardly disposed support structure 33 fixed to the vehicle 11 below floor 18 inwardly of the cut out area 19. A pair of guide channels 34 are mounted to vehicle chassis components 24, in parallel fashion, transverse to the long axis of the vehicle 11, and spaced apart the width of the area 19. The channels 34 are c-shaped in cross section, opening toward each other, and have internal bearing surfaces. Hydraulic or pneumatic cylinders 35 of well known type are mounted to vehicle chassis component 25.

Figure 6:
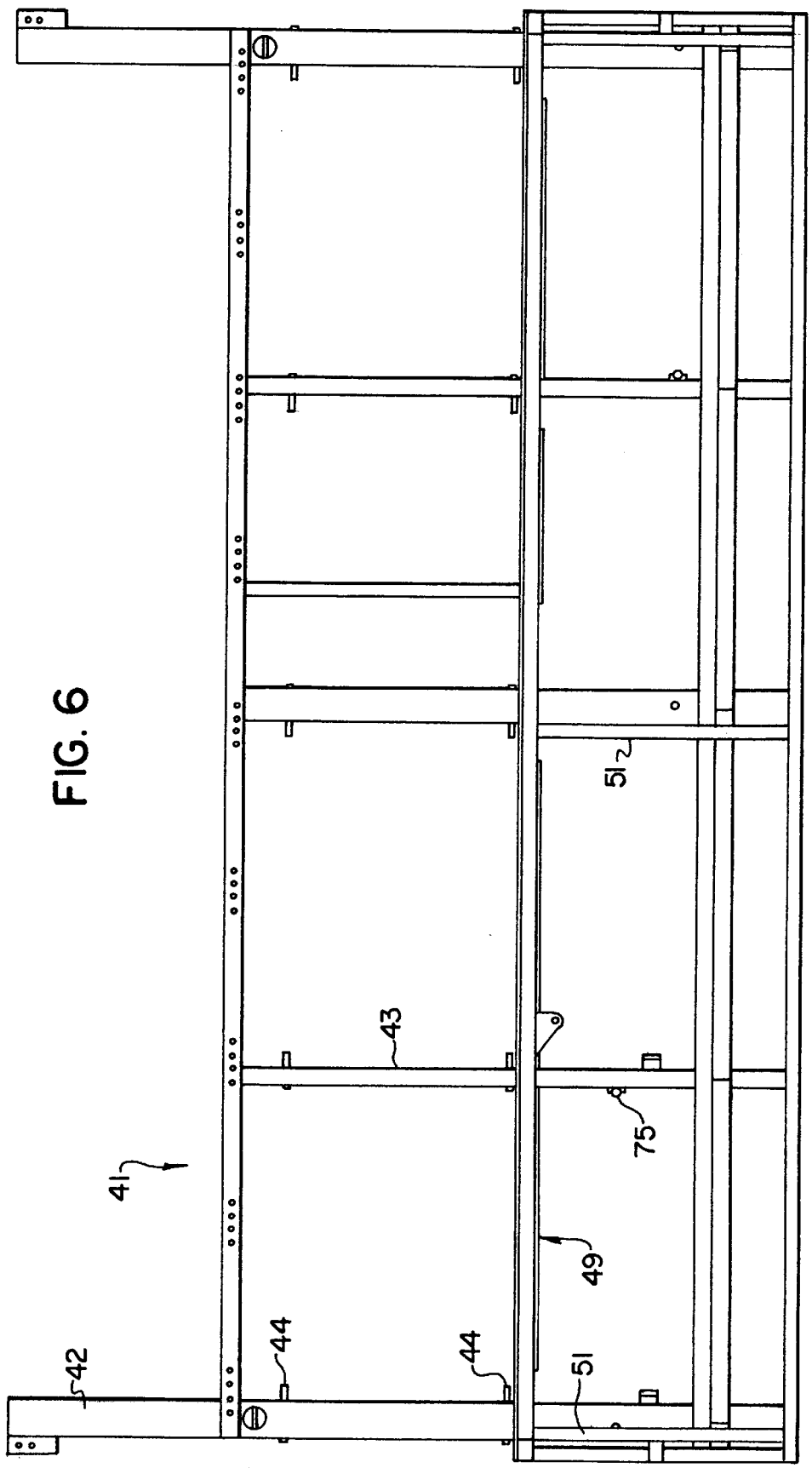
FIG. 6 is a view as in FIG. 5 but with additional components removed to show underlying structures.
Figure 7:
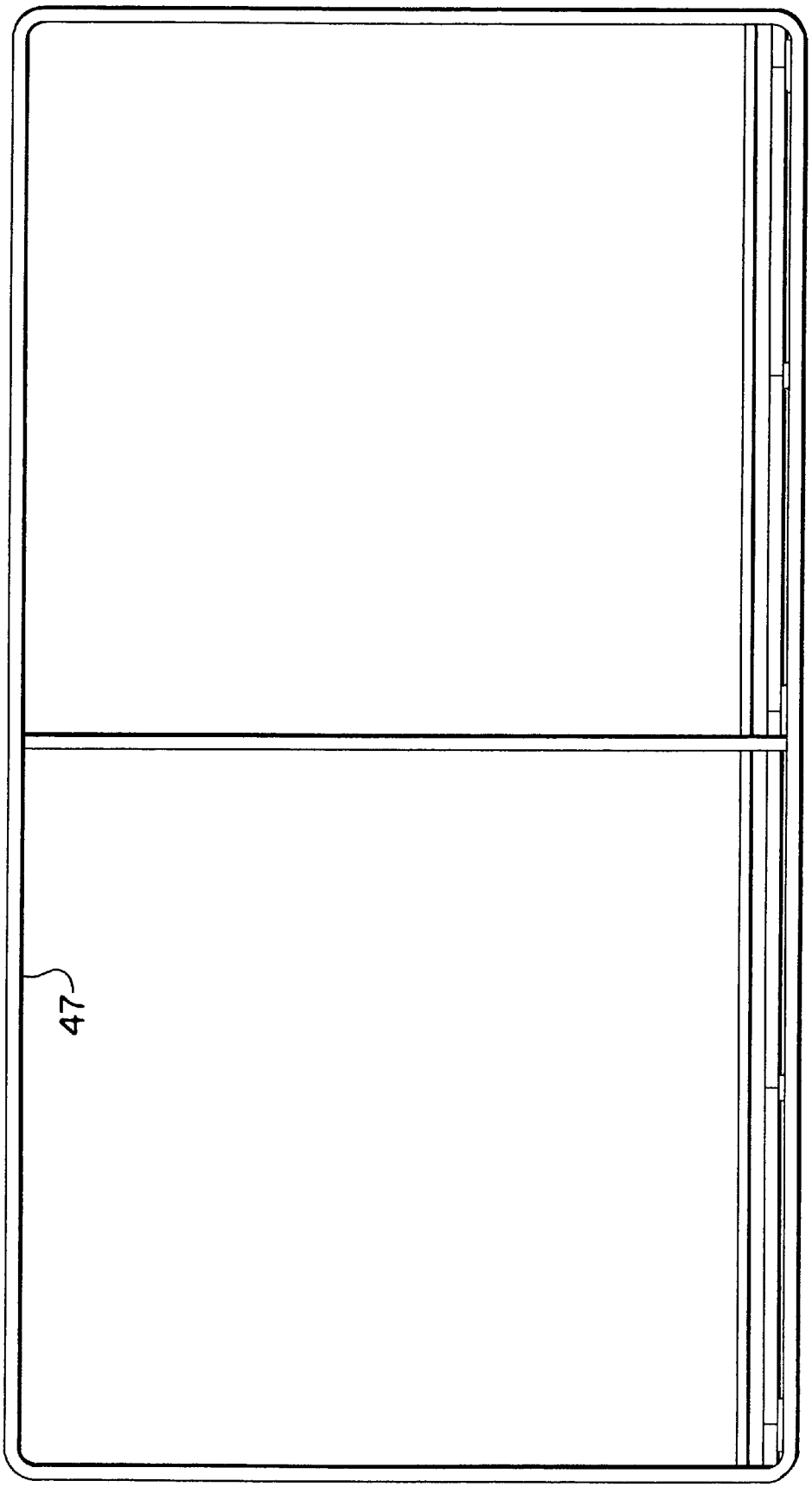
FIG. 7 is an elevational view taken along line D—D in FIG. 6.
Figure 8:
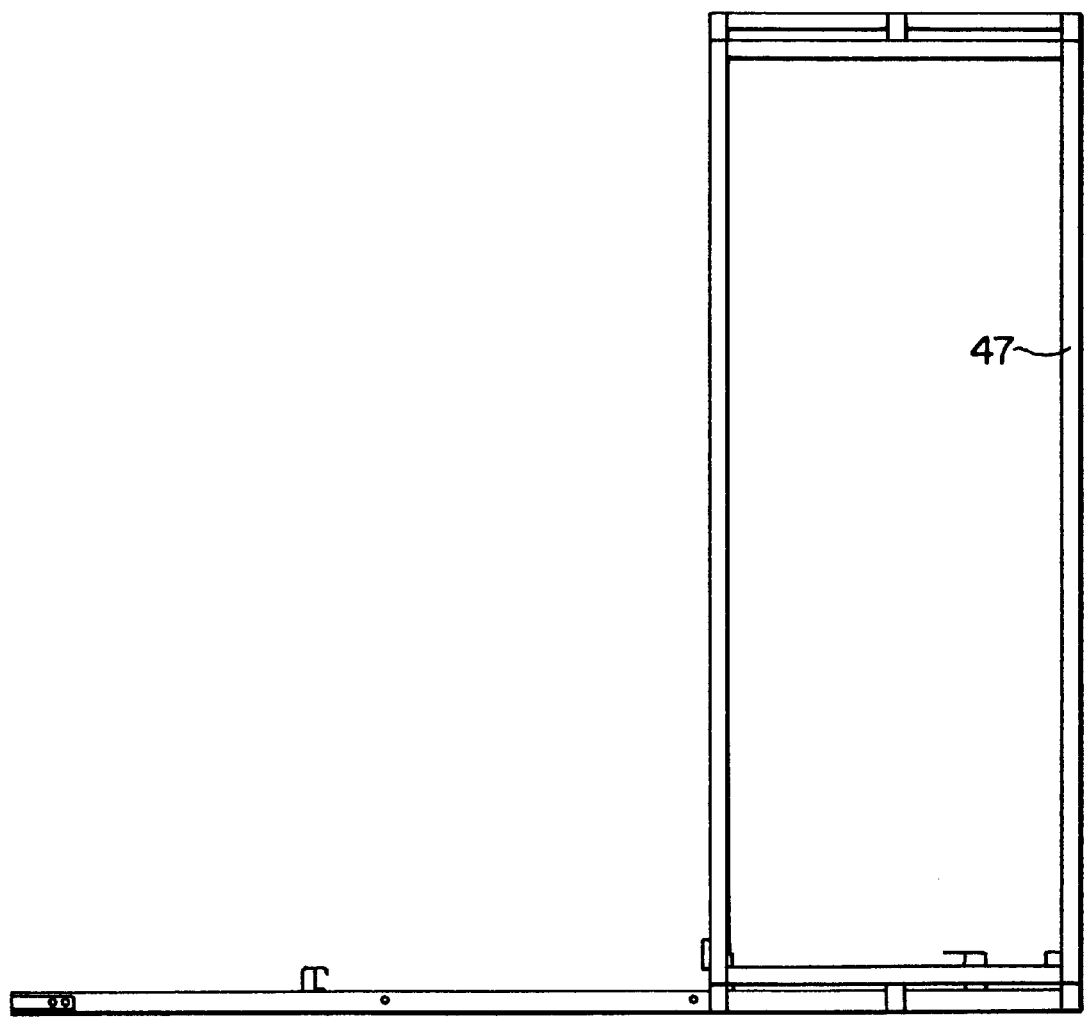
FIG. 8 is an elevational view taken along line E—E in FIG. 6.
Figure 9:
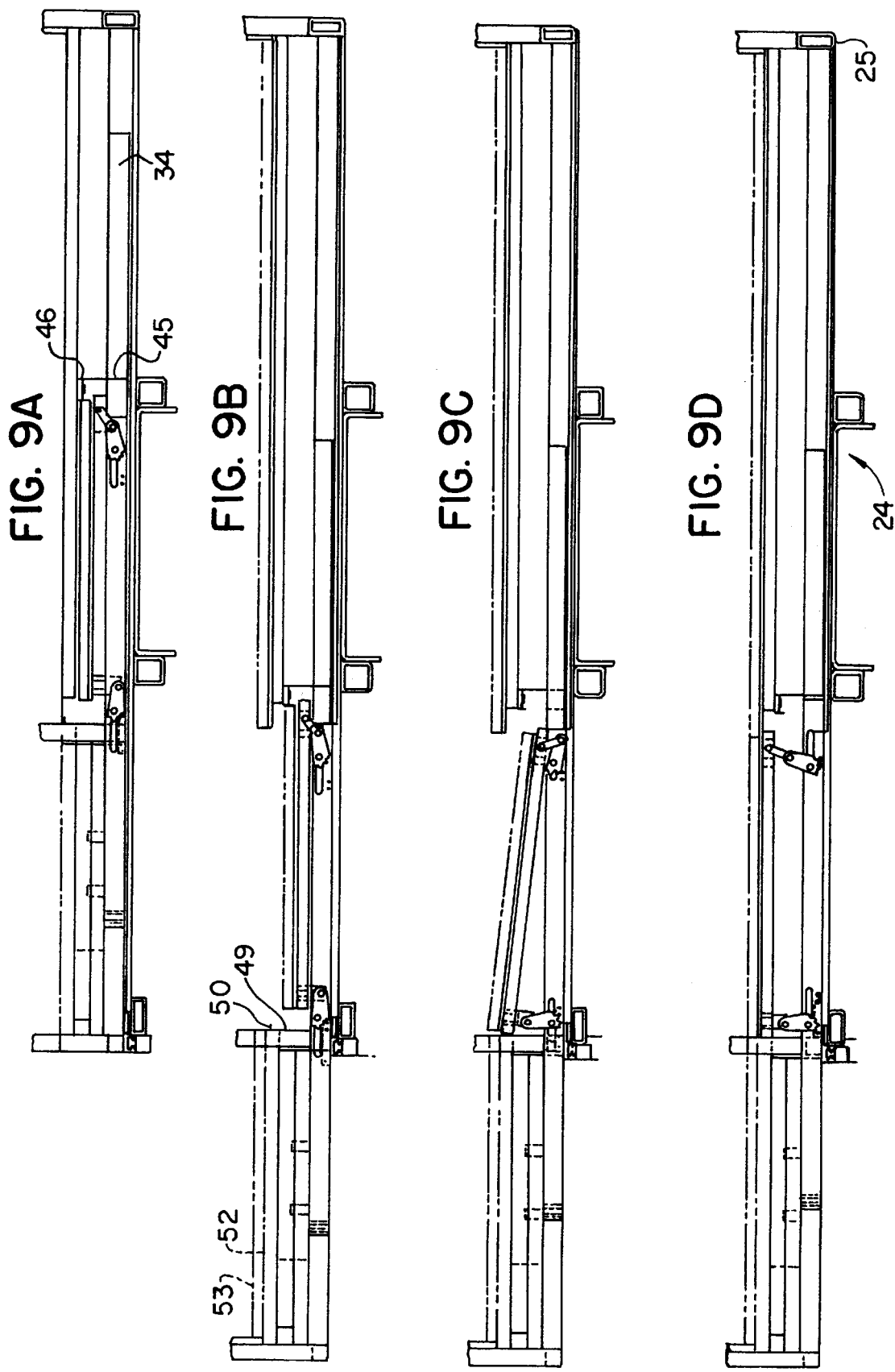
FIGS. 9A, 9B, 9C and 9D are fragmentary sectional views taken along line C—C in FIG. 1 showing operation of the level floor room extension.
Figure 10:
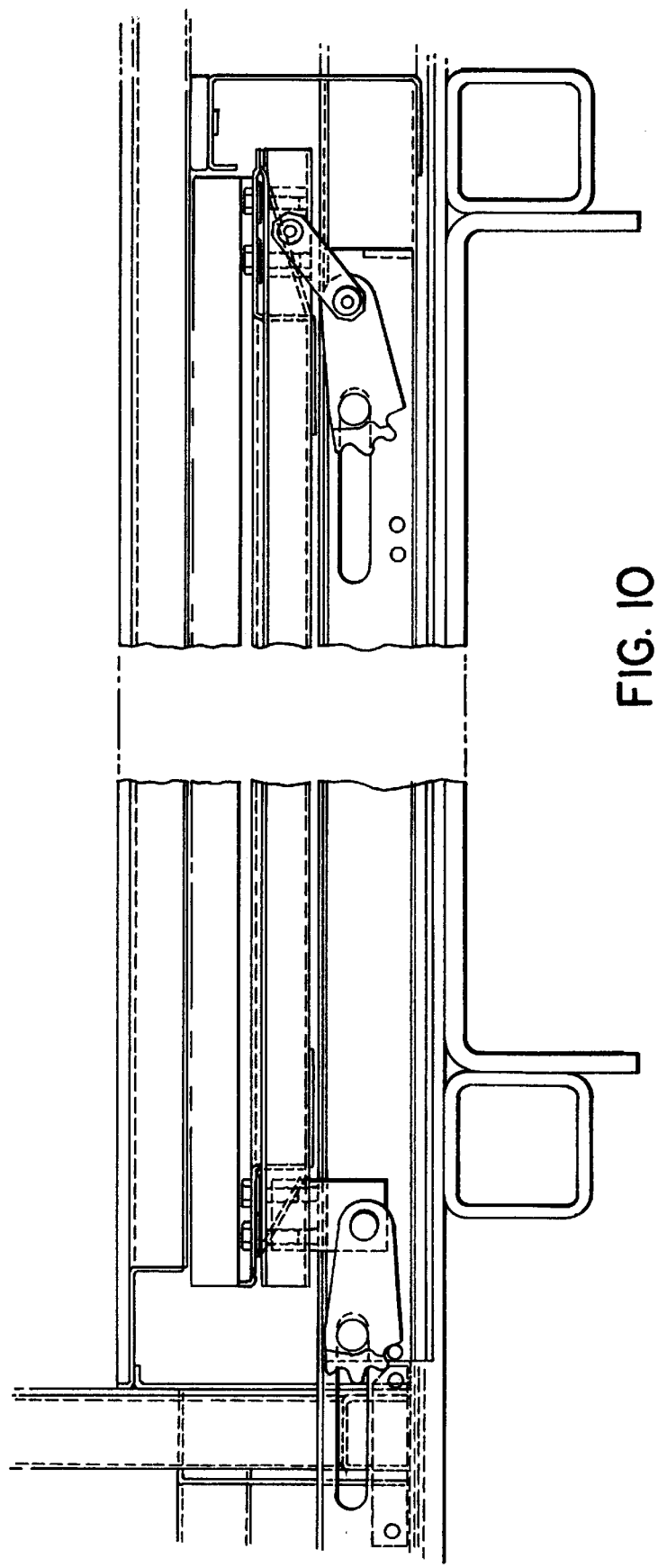
FIG. 10 is an enlarged portion of FIG. 9A showing the slideout room retracted with subfloor stored.
Figure 11:
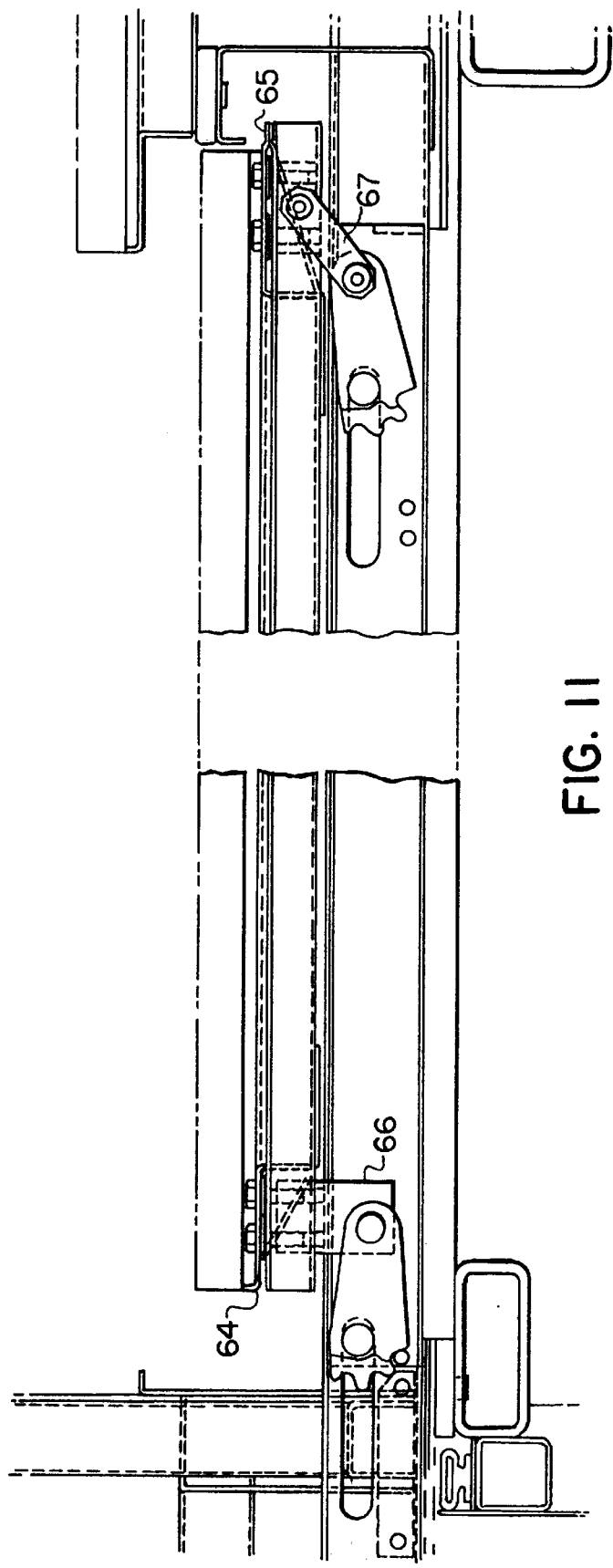
FIG. 11 is an enlarged portion of FIG. 9B showing the slideout room extended with subfloor positioned for elevation.
Figure 12:
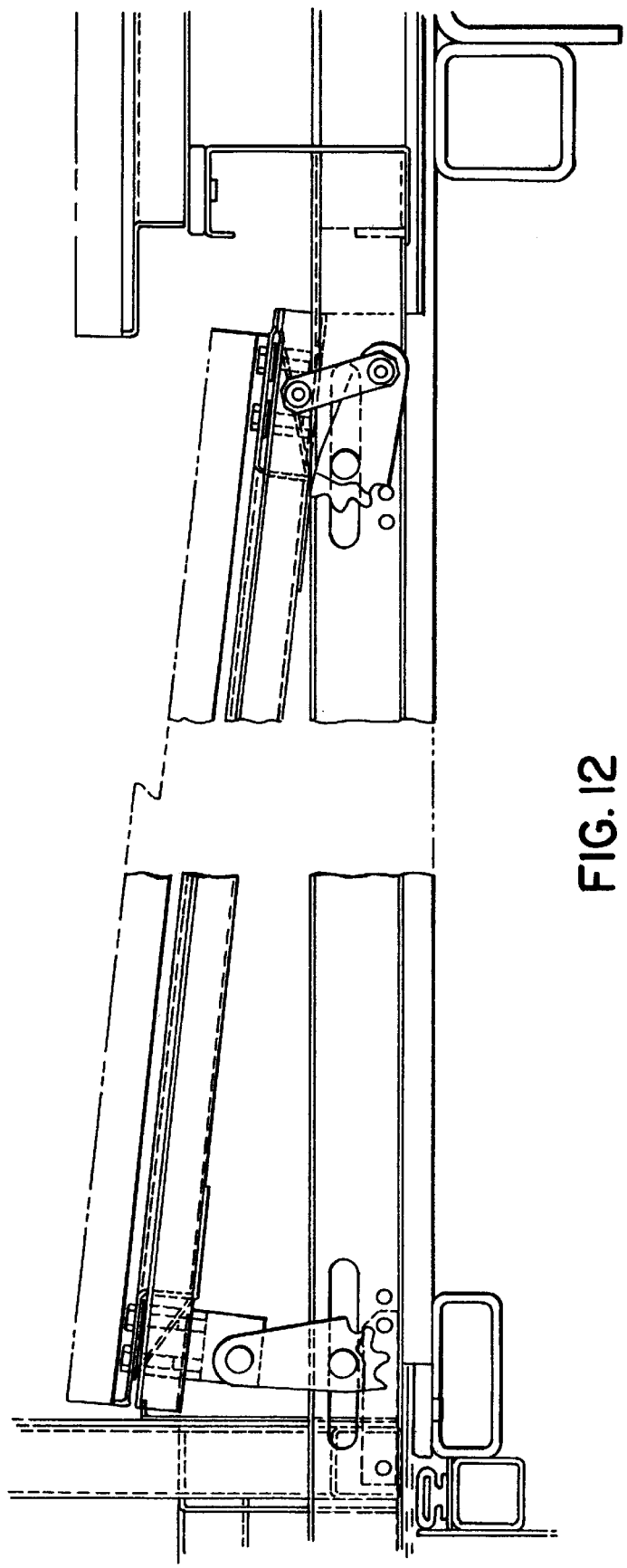
FIG. 12 is an enlarged portion of FIG. 9C showing the outer end of the subfloor elevated.
Figure 13:
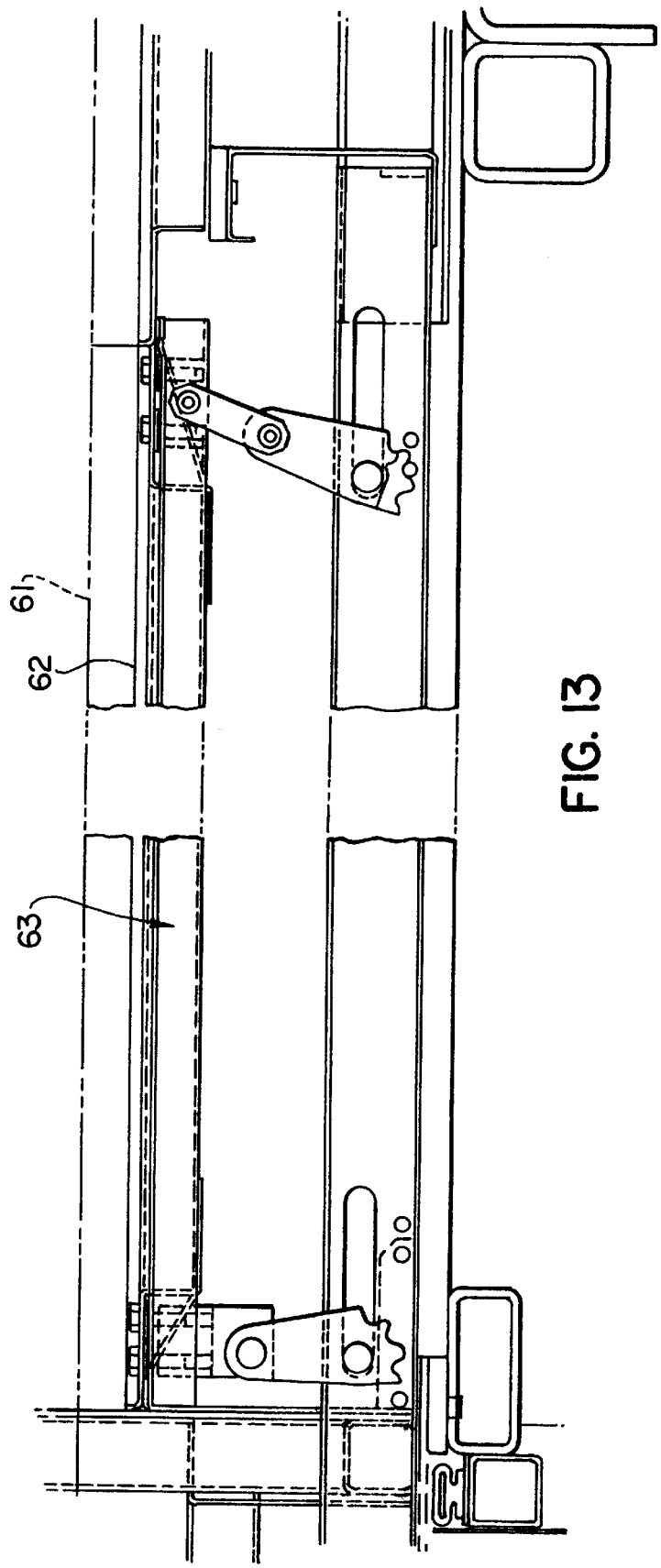
FIG. 13 is an enlarged portion of FIG. 9D showing the subfloor fully elevated.
Figure 14A:
FIGS. 14A, 14B, 14C, and 14D are enlarged views of the rack members.
Figure 14B:
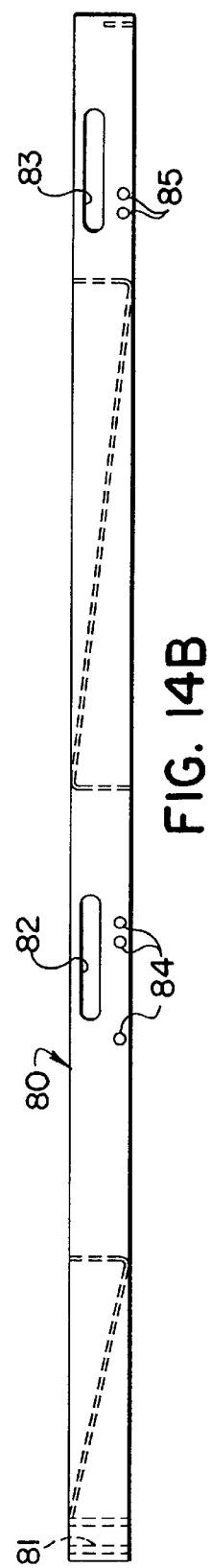
Figure 14C:
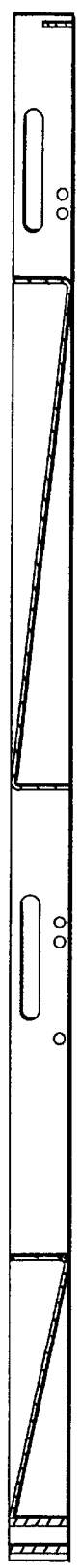
Figure 14D:
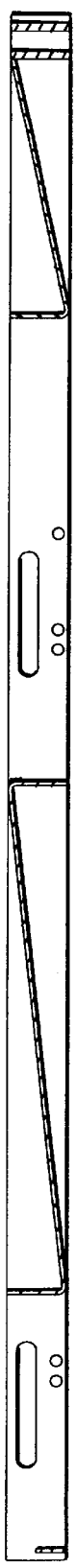
Figure 15A:
FIGS. 15A, 15B, 15C, and 15D are enlarged views of an alternate rack member.
Figure 15B:
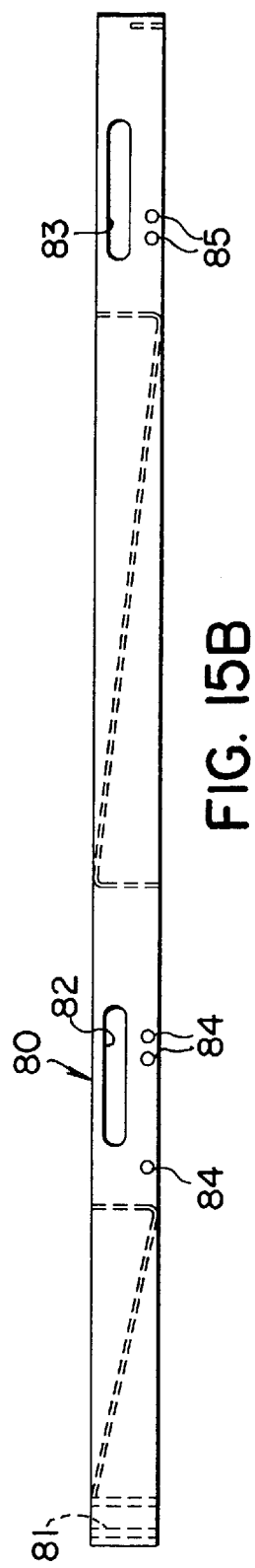
Figure 15C:
Figure 15D:
Figure 16A:
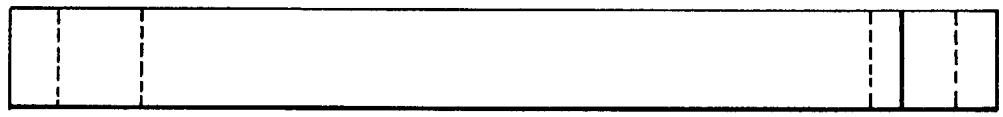
FIGS. 16A and 16B are enlarged views of the subfloor lifter.
Figure 16B:
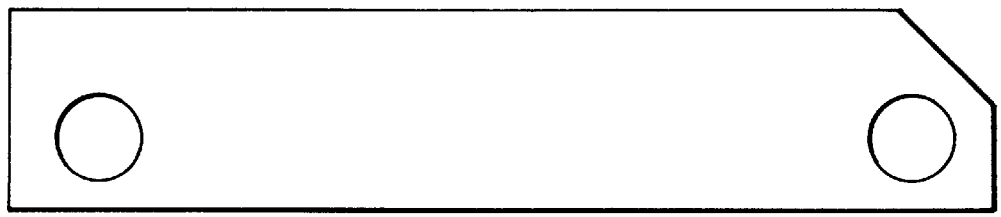
Figure 17A:
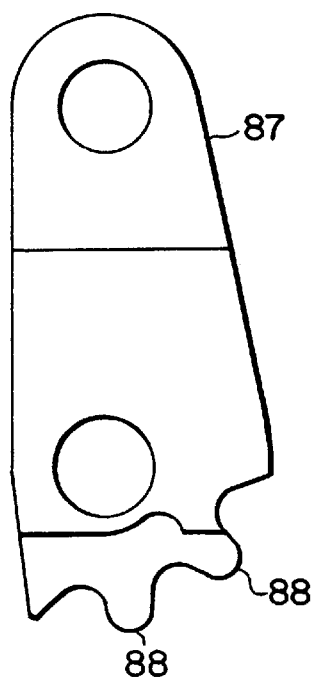
FIGS. 17A and 17B are enlarged views of the floor lifter cam.
Figure 17B:
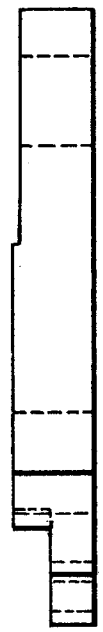

The level floor room extension 10 has a slide out room assembly 40. The framework 41 (see FIG. 6) includes two outside tubes 42 which extend into guide channels 34 and are attached to hydraulic or pneumatic cylinders 35. The plurality of interior tubes 43 are disposed between tubes 42. The tubes 42, 43 carry pivot support pins 44. Cross member 45 connects tubes 42, 43 and carries slide blocks 46. The tubes 42, 43 extend forward to a front peripheral tube brace 47 which supports the slide out exterior sidewall 48.

Intermediate cross member 45 and front peripheral tube 47 is a second cross member 49 extending upwardly from tubes 42, 43. This member 49 includes a flange plate 50 which projects rearwardly. Several upper tubes 51 extend from member 49 forward to attachment with tube brace 47. Slide out room flooring 52 and carpet 53 are supported by tubes 51.

The level floor room extension 10 further has a movable subfloor assembly 60. A top carpet layer 61 is supported by flooring 62 which in turn is mounted on a framework 63. The framework includes an outer or front flange surface 64 and a rear or inner shoulder surface 65. A plurality of plates 66 are arranged along the front part of, and depend downwardly from, the framework 63. Along the rear of framework 63 the series of links 67 are pivotally attached to, and swing downwardly from, the framework 63.

Figure 5:
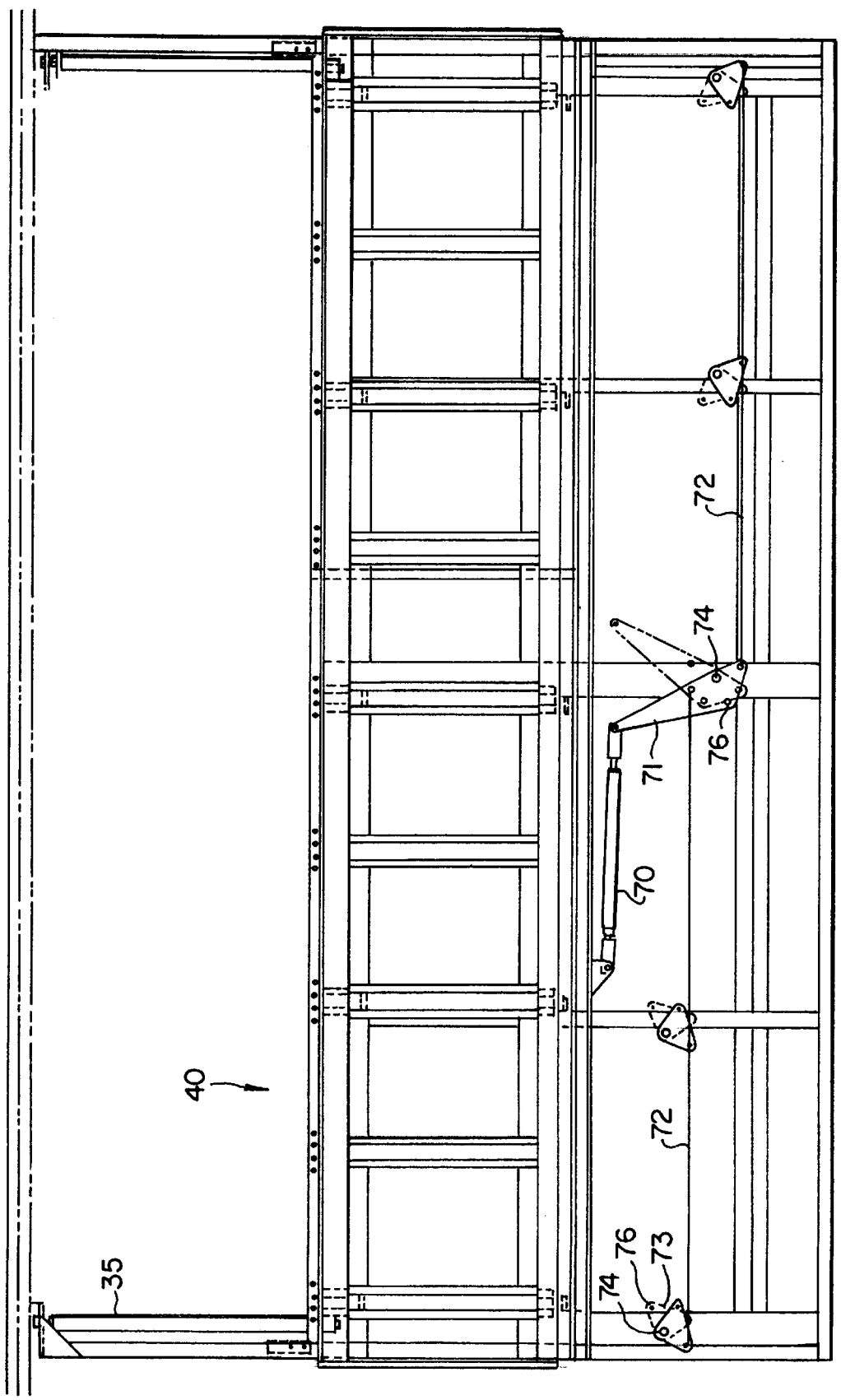
FIG. 5 is a view as in FIG. 3 but with some floor components removed to show support structures.

Referring to FIG. 5, a second hydraulic or pneumatic cylinder 70 is mounted to member 49 and extends to main crank 71. Couplings 72 extend from crank 71 to additional cranks 73. Crank pin 74 pivotally attach the crank 71, 73 to crank pivot 75 on tubes 42, 43. Drive pins 76 extend downwardly from the cranks 71, 73.

The plurality of racks 80 each have a front bore 81 for receiving drive pin 76, and intermediate longitudinal slots 82 and rear longitudinal slots 83 for receiving pivot support pins 44. Each rack 80 carries three longitudinally spaced transverse pins 84 adjacent and below slots 82 and two longitudinally spaced transverse pins 85 adjacent and below slots 83. The flat subfloor lifters 86 are mounted between the two forward pins 84. Cam floor lifters 87 are mounted on each pivot pin 44 and extend upwardly to pivotal connection with depending links 67. A plurality of lobes 88 are formed at the lower ends of lifters 87.

As shown particularly in FIGS. 9A–9B and FIGS. 10–13, actuation of the cylinders 35 causes slide out room assembly 40 to move outwardly. Actuation of cylinder 70 then causes the racks 80 to engage the cam floor lifters 88 in the sequence depicted, causing elevation of the subfloor 60.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooded parts together, whereas a screw employs a helical surface, in the environment of fastening wooden parts, a nail and a screw may be equivalent structures.

What is claimed is:

1. A level floor room extension system, comprising:

vehicle having a slide-out room assembly in a sidewall of said vehicle, said vehicle having chassis components supporting a vehicle floor surface, said slide-out room assembly having a room floor surface substantially planar with said vehicle floor surface, said vehicle floor surface having a three-sided cutout around said room floor surface;

first actuators for extending said slide-out room assembly from a first position adjacent said three-sided cutout of said vehicle floor surface to a second position substantially planar to and outwardly of said vehicle floor surface, whereby a space is created between said room floor surface and said vehicle floor surface;

a subfloor assembly having a subfloor surface, wherein said subfloor assembly is moveable from a lowered beginning position below said vehicle floor surface to a final raised position within said space between said room floor surface and said vehicle floor surface; and a second actuator for raising said subfloor assembly from said lowered position to said raised position, wherein said subfloor surface is planar with said vehicle floor surface and said room floor surface such that a continuous substantially planar floor surface is created across said vehicle and said slide-out room assembly.

2. The floor extension of claim 1 wherein actuation of said first actuators causes said subfloor assembly to move outwardly along with said slide-out room assembly to an intermediate position.

3. The floor extension of claim 2 wherein said subfloor maintains a substantially horizontal orientation when moving outwardly from said lowered beginning position below said vehicle floor surface to said intermediate position where said subfloor is then raised from its lowered position to a final raised position by action of said second actuator.

4. The level floor extension of claim 3 wherein said vehicle includes a slide-out room support assembly having an inwardly disposed support structure fixed to said vehicle chassis, said support structure including a pair of guides spaced apart in parallel fashion the width of said cutout area, and wherein said slide-out room support assembly includes an outward peripheral frame, an intermediate frame member, and a room floor structure, said room floor structure including outside slide members spaced apart the width of said slide-out room assembly and slidable within said guides of said support structure, and a plurality of interior slide members disposed between said outside slide members.

5. The floor extension of claim 4 wherein said first actuators are connected at one end to said vehicle chassis and at another end to said outside slide members of said room floor structure.

6. The floor extension of claim 5 wherein said second actuator is operably connected at one end to said intermediate frame member and operably connected at another end to said subfloor assembly for raising said subfloor assembly from a lowered position to a raised position.

7. The floor extension of claim 6 wherein said another end of said second actuator is pivotally connected to a main crank which is pivotally connected to an interior slide member, said main crank is also in turn coupled to additional cranks pivotally connected to other said plurality of interior slide members and outside slide members.

8. The floor extension of claim 7 wherein said subfloor assembly includes, a subfloor framework for supporting said subfloor surface, and cam floor lifters pivotally connected to said subfloor framework, said cam floor lifters having a plurality of lobes formed therein and an aperture for receiving pivot support pins projecting from said outside slide members and interior slide members.

9. The floor extension of claim 8 wherein a plurality of racks are disposed adjacent to and in parallel relationship with said outside and interior slide members, said racks including longitudinal slots therein for also receiving pivot support pins projecting from said outside slide members and interior slide members, said racks further including a front bore for receiving a drive pin projecting from said cranks, said racks further including spaced transverse pins below said longitudinal slots.

10. The floor extension of claim 9 wherein actuation of said second actuator causes said cranks to rotate, thereby causing said racks to move inwardly with respect to said pivot support pins projecting through said longitudinal slots in said racks and through said cam floor lifters, said inward movement of said racks causing said lobes in said cam floor lifters to engage said spaced transverse pins below said longitudinal slots of said racks thereby causing said cams to rotate upwardly about said transverse pins which in turn forces said subfloor surface to raise to said final raised position.

* * * * *